(12) United States Patent
Gabriel

(10) Patent No.: US 6,361,706 B1
(45) Date of Patent: Mar. 26, 2002

(54) METHOD FOR REDUCING THE AMOUNT OF PERFLUOROCOMPOUND GAS CONTAINED IN EXHAUST EMISSIONS FROM PLASMA PROCESSING

(75) Inventor: Calvin Todd Gabriel, Cupertino, CA (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/374,469

(22) Filed: Aug. 13, 1999

(51) Int. Cl.⁷ .................. H01L 21/302; C03C 25/68; B01D 53/00
(52) U.S. Cl. .............. 216/67; 438/710; 204/157.3; 588/210; 588/212; 588/227; 588/247; 588/248
(58) Field of Search .............. 204/157.3; 588/210, 588/212, 227, 247, 248; 216/67; 438/710

(56) References Cited

U.S. PATENT DOCUMENTS

| 5,907,077 A | 5/1999 | Harashima |
| 5,965,786 A | * 10/1999 | Rostaing et al. ............ 588/210 |
| 6,045,618 A1 | * 4/2001 | Raoux et al. ............... 118/715 |

FOREIGN PATENT DOCUMENTS

| EP | 0 916 388 A2 | 5/1999 |
| JP | 03-065218 | * 3/1991 |
| JP | 08-222551 | * 8/1996 |
| JP | 11-076740 | * 3/1999 |

OTHER PUBLICATIONS

Abstract of Japanese Patent Publication 11 244656, Patent Abstracts of Japan, vol. 1999, No. 14, Dec. 22, 1999.

* cited by examiner

*Primary Examiner*—George Goudreau
(74) *Attorney, Agent, or Firm*—Martine & Penilla, LLP

(57) ABSTRACT

In a method for treating perfluorocompound gas contained in exhaust emissions from plasma processing a plasma abatement device is first provided downstream of a plasma processing chamber. Next, perfluorocompound gas contained in exhaust emissions from the plasma processing chamber is channeled into the plasma abatement device. A gas containing water vapor is then introduced into the plasma abatement device. In a method for reducing the amount of perfluorocompound gas contained in exhaust emissions from plasma processing exhaust emissions from plasma processing containing a perfluorocompound gas are contacted with a gas containing water vapor. The exhaust emissions from plasma processing containing the perfluorocompound gas may be contacted with the gas containing water vapor in either a plasma abatement device provided downstream of a plasma processing chamber or directly in the plasma processing chamber. A method for forming an integrated circuit also is described.

7 Claims, 4 Drawing Sheets

METHOD FOR REDUCING THE AMOUNT OF PERFLUOROCOMPOUND GAS CONTAINED IN EXHAUST EMISSIONS FROM PLASMA PROCESSING

BACKGROUND OF THE INVENTION

The present invention relates generally to semiconductor fabrication and, more particularly, to a method for reducing the amount of perfluorocompound gas contained in exhaust emissions from plasma processing, a method for treating perfluorocompound gas contained in exhaust emissions from plasma processing, and a method for forming an integrated circuit.

Despite efforts throughout the world to ban the use of chlorofluorocarbon gases (CFCs), global warming remains a concern. Thus, efforts to reduce the adverse effect of gases other than CFCs have increased in recent years. In the area of semiconductor fabrication, much attention has been focused on the adverse effect exhaust emissions from plasma processes have on global warming. In particular, efforts are being made to reduce the amount of perfluorocompound gases (PFCs) in exhaust emissions from plasma processes, even though the emission levels of PFCs from plasma processing are far lower than emission levels of $CO_2$ from combustion sources. These efforts are being made because even relatively small amounts of PFCs such as $CF_4$ and $C_2F_6$ have a significant impact on global warming because of their longevity in the atmosphere. Indeed, some PFCs persist in the atmosphere for thousands of years and, as a consequence of such longevity, the global warming potential (GWP) of, for example, $SF_6$ is about 24,000 times greater than that of $CO_2$. Thus, techniques for reducing the emission of PFCs from plasma processes are currently being studied.

The optimal way to reduce the emission of PFCs from plasma processes would be to replace PFCs with alternative gases. At present, however, the replacement of PFCs with other gases is not technically feasible. Another way to avoid the emission of PFCs from plasma processes would be to capture and recover all emitted PFCs. Unfortunately, however, the capture and recovery of all emitted PFCs is not currently an economically viable alternative for semiconductor manufacturers. Thus, the most attractive technique for reducing the emission of PFCs from plasma processes in the near term is abatement, which involves the conversion of PFCs into less harmful forms before venting the exhaust gases to the atmosphere.

As reported by Marci Liao, Kent Wong, and Jim McVittie in a presentation entitled "Inductive Coupled Plasmas for Point-of-Use PFC Abatement," (Plasma Etch Users Group (PEUG) Talk, Feb. 17, 1998), one potential PFC abatement scheme involves plasma oxidation of PFCs in a secondary plasma processing chamber. In this PFC abatement scheme exhaust emissions from a plasma processing chamber are carried by the pumping action of a turbopump into an inductively coupled plasma processing chamber in which a secondary plasma is generated. Oxygen is added to the secondary plasma to oxidize the PFCs in the exhaust emissions into gases having lower GWP. From the inductively coupled plasma processing chamber, the thus-treated exhaust emissions are carried by the pumping action of a backing pump into a scrubber. After passing through the scrubber, the exhaust emissions are vented to the atmosphere.

In a plasma oxidation PFC abatement scheme such as that described above a relatively high flow rate of oxygen is required to abate a selected percentage, e.g., 85%, of the PFCs from the exhaust emissions. The introduction of large amounts of oxygen is disadvantageous because it increases the loading on the vacuum pump in the plasma processing system, which may substantially increase the operating costs for the system. Furthermore, in the event a more powerful vacuum pump is required to handle this increased loading, significant capital expenditures must be incurred to obtain such a pump and retrofit it into the plasma processing system. In light of these significant cost and retrofittability issues, a plasma oxidation PFC abatement scheme may not be a preferred solution for semiconductor manufacturers.

In the PFC abatement scheme described above, hydrogen may be a more effective abatement gas than oxygen. In other words, by using hydrogen as the abatement gas rather than oxygen, the selected percentage, e.g., 85%, of the PFCs from the exhaust emission may be abated using a lower flow rate of the abatement gas. Thus, from the standpoint of minimizing increased loading on the vacuum pump in the plasma processing system, the substitution of hydrogen as the abatement gas appears promising. Unfortunately, however, hydrogen ($H_2$) and methane ($CH_4$), which may be formed when hydrogen reacts with PFCs, are hazardous gases and require the use of costly double-contained piping. As such, the use of hydrogen as an abatement gas for PFCs is undesirable because it is not only expensive, but also raises significant safety issues.

In view of the foregoing, there is a need for a method for reducing the amount of PFCs contained in exhaust emissions from plasma processing that does not require substantially increased vacuum pump capacity in the plasma processing system and does not present significant safety hazards.

SUMMARY OF THE INVENTION

Broadly speaking, the present invention fills this need by providing a plasma processing system in which water vapor is used as an abatement gas to reduce the amount of perfluorocompound gas in exhaust emissions from plasma processing.

In accordance with one aspect of the present invention, a method for treating perfluorocompound gas contained in exhaust emissions from plasma processing is provided. In this method a plasma abatement device is first provided downstream of a plasma processing chamber. Next, perfluorocompound gas contained in exhaust emissions from the plasma processing chamber is channeled into the plasma abatement device. A gas containing water vapor is then introduced into the plasma abatement device. By way of example, the perfluorocompound gas contained in the exhaust emissions may be $CF_4$, $C_2F_6$, $CHF_3$, $SF_6$, $NF_3$, $C_3F_8$, $C_4F_8$, and mixtures thereof.

In one embodiment, the plasma abatement device is a secondary plasma processing chamber. In this embodiment, the operation of introducing the gas containing water vapor into the plasma abatement device preferably includes selecting a percentage of perfluorocompound gas to be abated, determining a minimum flow rate of water vapor needed to abate the selected percentage of perfluorocompound gas, and introducing the gas containing water vapor into the plasma abatement device at the determined minimum flow rate. The gas containing water vapor preferably includes at least about 10% of water vapor.

In accordance with another aspect of the present invention, a method for reducing the amount of perfluorocompound gas contained in exhaust emissions from plasma processing is provided. In this method exhaust emissions from plasma processing containing a perfluorocompound gas are contacted with a gas containing water vapor.

In one embodiment, the exhaust emissions from plasma processing containing the perfluorocompound gas are contacted with the gas containing water vapor in a plasma abatement device provided downstream of a plasma processing chamber. In this embodiment, the plasma abatement device is preferably a secondary plasma processing chamber. In another embodiment, the exhaust emissions from plasma processing containing the perfluorocompound gas are contacted with the gas containing water vapor directly in the plasma processing chamber. This embodiment may be used only where the water vapor does not significantly degrade the performance of a plasma process in the plasma processing chamber. In either of these embodiments, the operation of introducing the gas containing water vapor is conducted at the determined minimum flow rate needed to achieve the selected percentage of abatement, as set forth above.

In accordance with yet another aspect of the present invention, a method for forming an integrated circuit is provided. In this method a semiconductor wafer is first provided. Next, the semiconductor wafer is subjected to plasma processing in a plasma processing chamber. The exhaust emissions from plasma processing containing a perfluorocompound gas are then contacted with a gas containing water vapor to reduce the amount of perfluorocompound gas contained in the exhaust emissions. The exhaust emissions may be contacted with the gas containing water vapor in either a plasma abatement device or directly in the plasma processing chamber, as set forth above.

The present invention provides a method that uses water vapor to reduce the amount of perfluorocompound gas contained in exhaust emissions from plasma processing. This method is advantageous because water vapor, which is a benign gas, dissociates into hydrogen and oxygen in a plasma. As such, the present invention achieves the benefits associated with the addition of hydrogen, e.g., efficient abatement of perfluorocompound gas, without the associated safety hazards. Furthermore, because water vapor abates perfluorocompound gas more efficiently than oxygen, the method of the invention can achieve an acceptable percentage of abatement at a flow rate that does not exceed the capacity of the pump typically used in commercial plasma processing systems. Thus, the method is further advantageous because it enables the abatement of perfluorocompound gas to be achieved without significantly increasing the operating costs of the plasma processing system or requiring significant capital expenditures to be incurred to obtain a more powerful pump and retrofit such pump into the system.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

The present preferred embodiments of the invention will now be described in detail with reference to the accompanying drawings.

The present invention provides for the use of water vapor as an abatement gas to convert perfluorocompound gases (PFCs) contained in exhaust emissions from plasma processing into gases that are less harmful to the atmosphere. As described in detail below, the invention may be implemented, by way of example, as a method for reducing the amount of perfluorocompound gas contained in exhaust emissions from plasma processing, as a method for treating perfluorocompound gas contained in exhaust emissions from plasma processing, or as a method for forming an integrated circuit.

Figure 1:
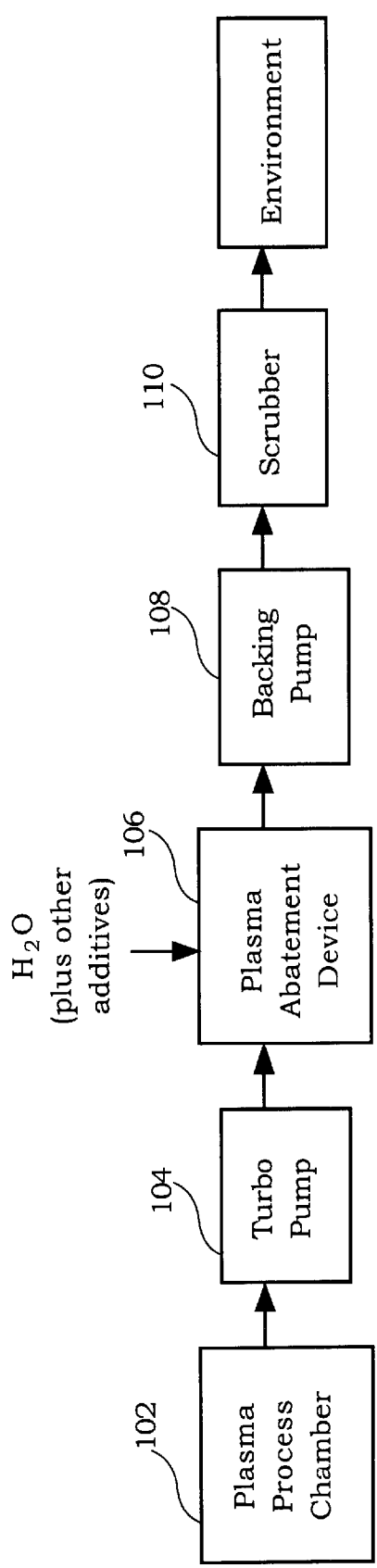
FIG. 1 is a simplified schematic diagram of a plasma processing system that uses water vapor as an abatement gas in accordance with one embodiment of the present invention.

FIG. 1 is a simplified schematic diagram of plasma processing system 100 that uses water vapor as an abatement gas in accordance with one embodiment of the present invention. As shown in FIG. 1, exhaust emissions from plasma processing chamber 102 are carried by the pumping action of turbopump 104 and channeled into plasma abatement device 106, which is preferably an inductively coupled plasma processing chamber in which a secondary plasma is generated. In accordance with the invention, water ($H_2O$) vapor is added to the secondary plasma for abatement purposes, i.e., to convert the PFCs in the exhaust emissions into gases having lower GWP. From the plasma abatement device 106, the thus-treated exhaust emissions are carried by the pumping action of backing pump 108 into scrubber 10. After passing through scrubber 110, the exhaust emissions are vented to the atmosphere. The details of the components of plasma processing system 100, namely plasma processing chamber 102, turbopump 104, plasma abatement device 106, backing pump 108, and scrubber 110, are well known to those skilled in the art.

In plasma processing system 100, water vapor may be added to plasma abatement device 106 in either pure form, i.e., 100% water vapor, or with other additives, e.g., oxygen. When a gas containing both water vapor and oxygen or other additives is used, the gas preferably contains at least about 10% of water vapor. As used in connection with the description of the invention, the phrase "a gas containing water vapor" includes pure water vapor and gases comprised of water vapor and other additives. When the water vapor enters the plasma, it dissociates into hydrogen and oxygen. Both hydrogen and oxygen react with the PFCs in the exhaust emissions and convert the PFCs into gases with lower GWP.

As used in connection with the description of the invention, the phrase "perfluorocompound gas" means a fluorine-containing gas having a relatively long atmospheric lifetime. The PFCs commonly found in exhaust emissions from plasma processing include, but are not limited to, $CF_4$, $C_2F_6$, $CHF_3$, $SF_6$, $NF_3$, $C_3F_8$, $C_4F_8$, and mixtures thereof. The carbon-containing compounds just listed, i.e., $CF_4$, $C_2F_6$, $CHF_3$, $C_3F_8$, and $C_4F_8$, are also referred to as perfluorocarbon materials. By way of example, when hydrogen and oxygen from water vapor react with $CF_4$, the abatement reaction products include $CO_2$, HF, and other secondary compounds. When other PFCs are abated with water vapor, other abatement reaction products including, but not limited to, $F_2$, $COF_2$, CO, and $CH_4$, may be generated. It will be apparent to those skilled in the art that the invention encompasses PFCs and abatement reaction products beyond those exemplary compounds specifically mentioned herein.

The water vapor added to plasma abatement device 106 may be generated by any suitable technique. In one embodiment, a water vapor delivery system including an enclosed tank and a mass flow controller is provided. In this system, after water is poured into the tank, the vapor pressure is raised, e.g., by heating the water, and the thus-created water vapor is taken off the top of the tank and delivered to plasma abatement device 106. The mass flow controller is provided between the tank and plasma abatement device 106 to regulate the flow rate at which the water vapor is added to device 106. Additional details regarding the optimal flow rate of water vapor will be described later. Alternatively, water vapor may be added to plasma abatement device 106 by a flash evaporation process. In this process water is injected directly into plasma abatement device 106 and instantly evaporates because of the low pressure, e.g., 1 torr, therein. The amount of the water vapor added to plasma abatement device 106 may be controlled by controlling the amount of water injected into device 106. For example, to generate about 500 sccm of water vapor, about one drop of water per minute may be added to plasma abatement device 106 using any suitable injection device, e.g., a needle valve.

Figure 2:
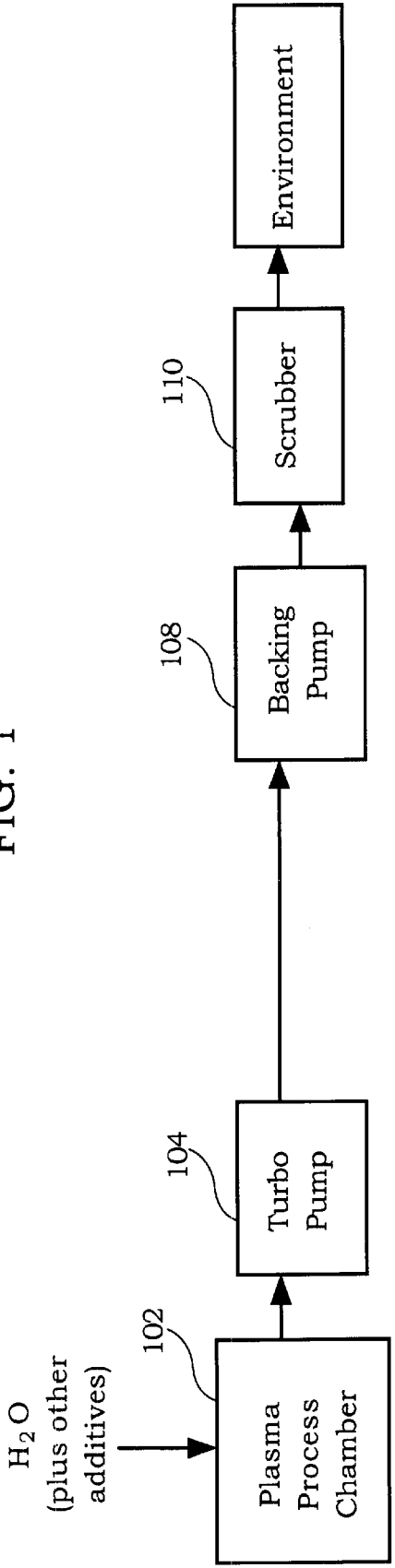
FIG. 2 is a simplified schematic diagram of a plasma processing system that uses water vapor as an abatement gas in accordance with another embodiment of the present invention.

FIG. 2 is a simplified schematic diagram of plasma processing system 200 that uses water vapor as an abatement gas in accordance with another embodiment of the present invention. As shown in FIG. 2, in plasma processing system 200 water vapor is added directly to plasma processing chamber 102. The direct addition of water vapor to plasma processing chamber 102 obviates the need for a separate plasma abatement device, e.g., plasma abatement device 106 shown in FIG. 1. It should be kept in mind, however, that the direct addition of water vapor to plasma processing chamber 102 may be used only in applications where the water vapor does not significantly degrade the performance of a plasma process in chamber 102. As used in connection with the description of the invention, the phrase "does not significantly degrade the performance of a plasma process" means that the resultant compounds formed by the reaction between water vapor and PFCs in a plasma processing chamber do not significantly interfere with the intended function of the plasma process.

In plasma processing system 200, water vapor may be added directly to plasma processing chamber 102 in either pure form, i.e., 100% water vapor, or with other additives, e.g., oxygen. In addition, the techniques for generating and delivering the water vapor described in connection with plasma processing system 100 also may be used with plasma processing system 200.

In both plasma processing systems 100 and 200, an important consideration is whether the addition of the abatement gas, which may be either water vapor or a gas containing water vapor, increases the loading on the pump to the point that a more powerful pump must be installed in the system. As discussed above, the addition of a more powerful pump is undesirable because it not only increases the operating costs of the system, but also increases the capital costs associated with retrofitting existing plasma processing systems with PFC abatement equipment. In the present invention, the operation in which the abatement gas is introduced into the plasma abatement device or the plasma processing chamber is controlled with a view to keeping any increased loading within the capacity of the existing system pump. To accomplish this objective, a percentage of perfluorocompound gas to be abated is first selected. In general, the abatement level should be selected to comply with any applicable standards promulgated by, e.g., a regulatory body. For example, a regulation may require that 90% or 95% of the perfluorocompound gas be abated. Next, a minimum flow rate of water vapor needed to abate the selected percentage of perfluorocompound gas is determined. The abatement gas is then introduced into the plasma abatement device or, if applicable, the plasma processing chamber at the determined minimum flow rate. Additional details concerning the introduction of the abatement gas at the determined minimum flow rate will become apparent to those skilled in the art upon consideration of the examples set forth below.

EXAMPLES

The method of the invention in which water vapor is used as an abatement gas to convert perfluorocompound gases (PFCs) contained in exhaust emissions from plasma processing into gases that are less harmful to the atmosphere will now be described in terms of specific examples. These examples illustrate preferred embodiments of the method of the invention and are included herein to explain the principles of the invention to those skilled in the art. It is therefore to be understood that the following examples are merely illustrative and should in no way be construed as limiting the method of the invention to any particular configuration or application.

Comparative Example 1

An abatement test was conducted in a Lam TCP™ 9600SE inductively coupled plasma chamber, which is commercially available from Lam Research Corporation of Fremont, Calif. A silicon wafer was present in the chamber during the test. The test was conducted to study the conversion of 180 sccm of $CF_4$ flowing into the chamber ($CF_4$ was chosen as a representative PFC because it has been recognized by those skilled in the art as being more difficult to abate than other PFCs). The optical emission spectrum of the plasma was measured with a spectrometer for (a) for plasma with 180 sccm of $CF_4$ and no other additives and (b) for plasma with 180 sccm of $CF_4$ with 200 sccm of $O_2$ as an additive. The data from these tests is shown in FIGS. 3, 4A, and 4B, which are discussed in detail below.

Example 2

The abatement test described in Comparative Example 1 was repeated to analyze the effectiveness of using water vapor as an abatement gas. Specifically, under the same conditions, the optical emission spectrum of a plasma was measured with a spectrometer for a plasma with 180 sccm of $CF_4$ with 200 sccm of water ($H_2O$) vapor as an additive. The data from this test is also shown in FIGS. 3, 4A, and 4B.

Figure 3:
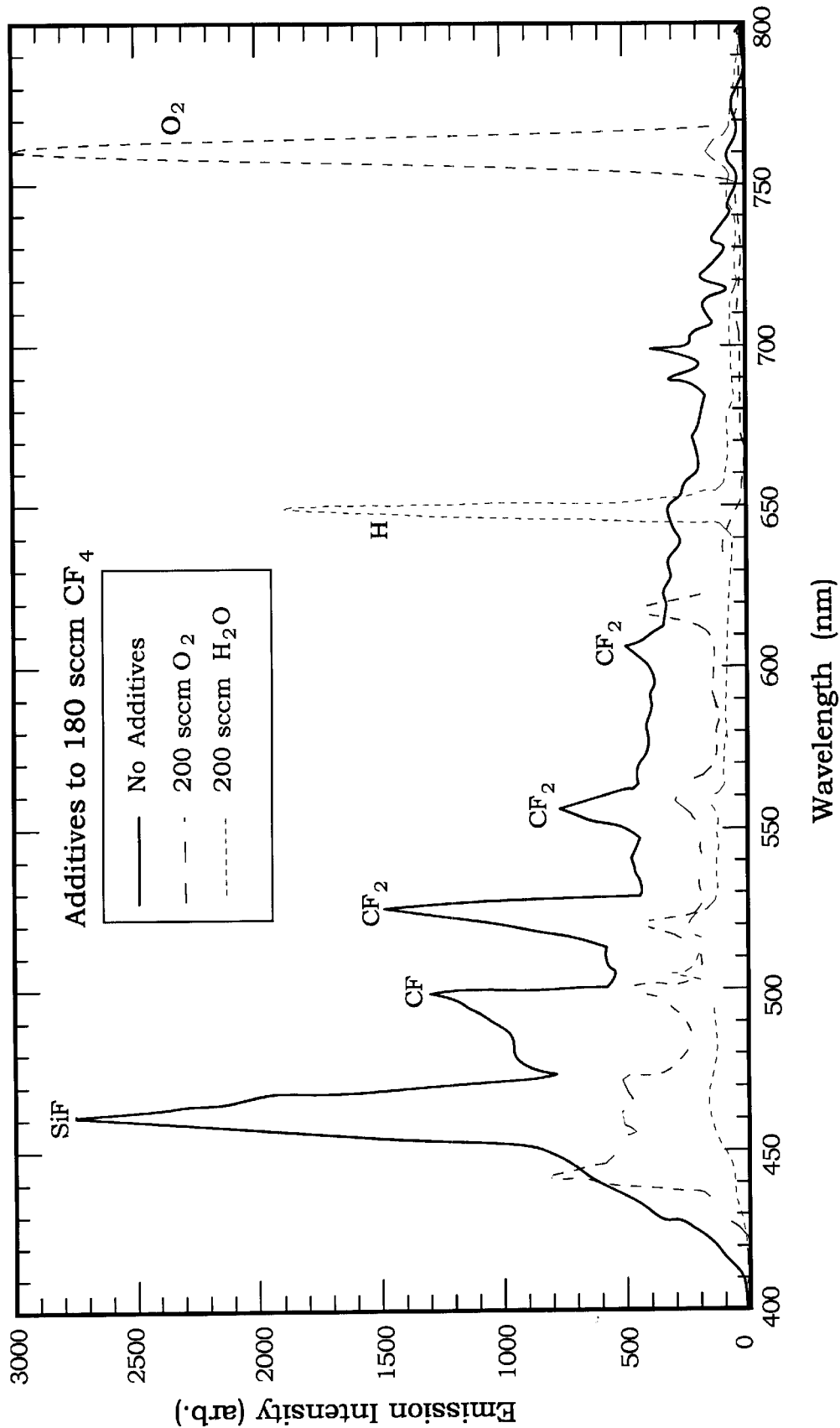
FIG. 3 is a graph of emission intensity as a function of wavelength that shows the optical emission spectra for the $CF_4$ plasmas tested with no additives (the spectrum shown by the solid line), with 200 sccm of $O_2$ as an additive (the spectrum shown by the dashed line), and with 200 sccm of water vapor as an additive (the spectrum shown by the dotted line).
Figure 4A:
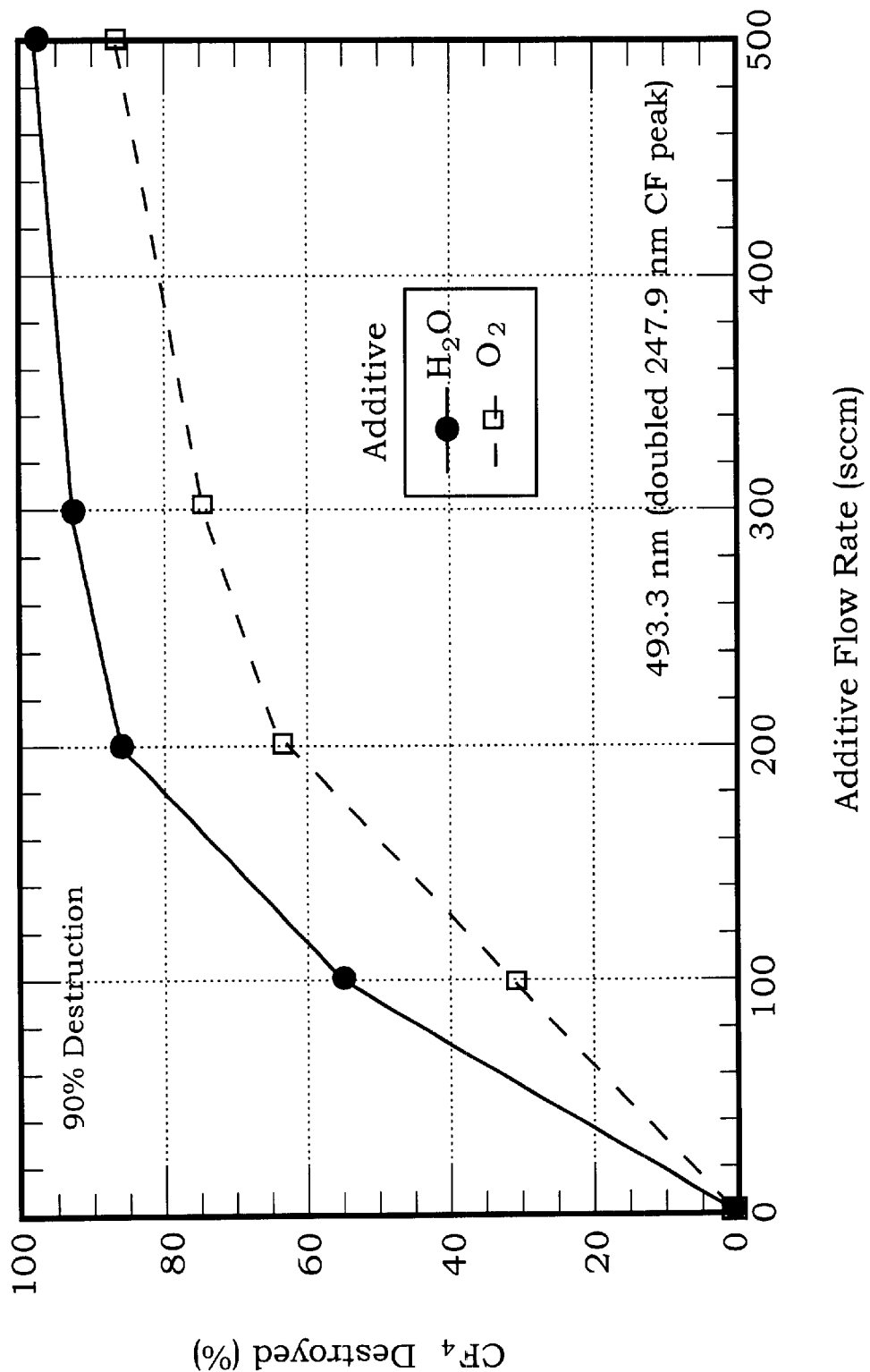
FIG. 4A is a graph of the $CF_4$ destruction efficiency, i.e., the percentage of $CF_4$ converted into less harmful forms, as a function of the additive flow rate as indicated by the decreased optical emission peak of CF.
Figure 4B:
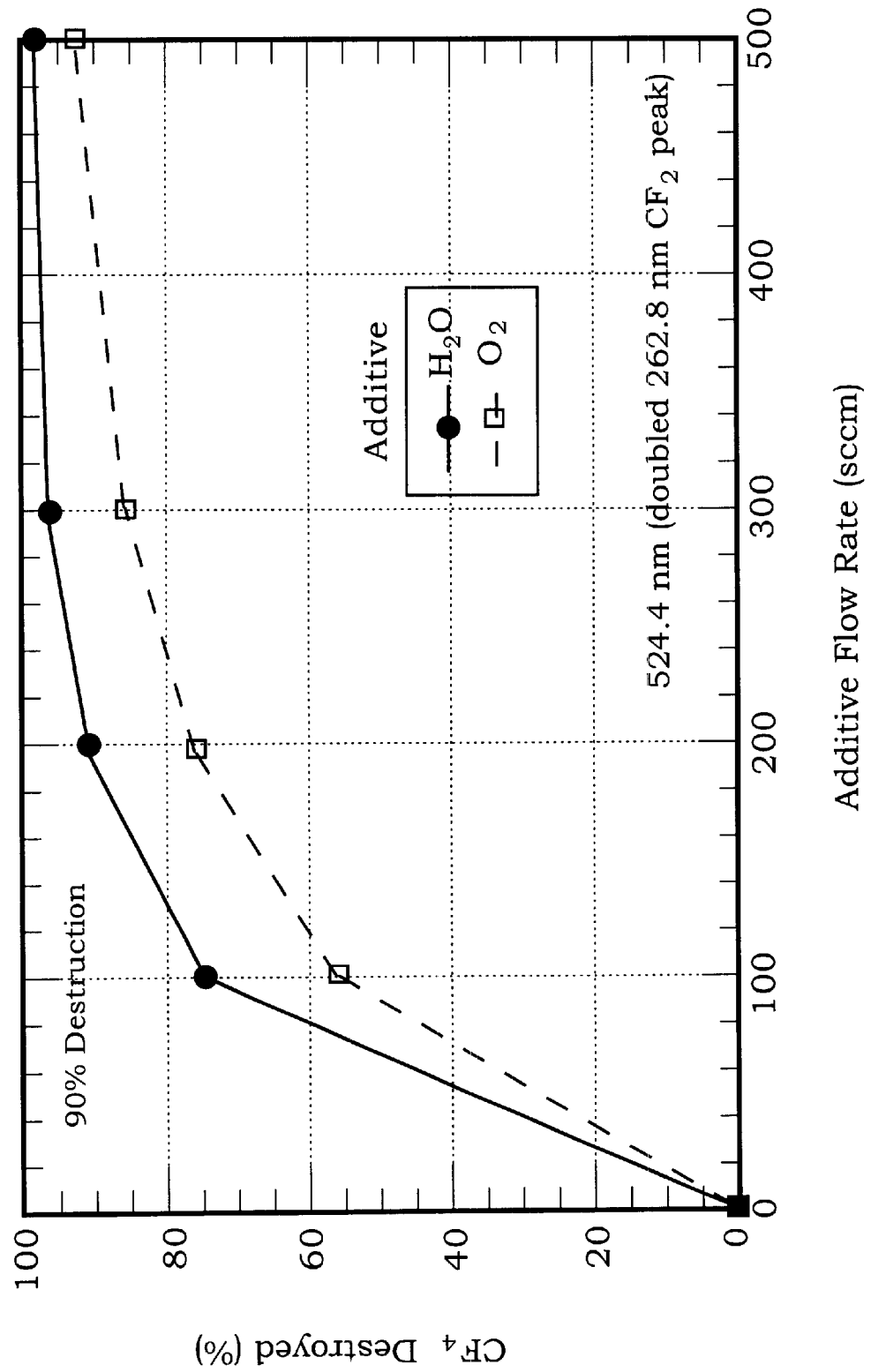
FIG. 4B is a graph of the $CF_4$ destruction efficiency, i.e., the percentage of $CF_4$ converted into less harmful forms, as a function of the additive flow rate as indicated by the decreased optical emission peak of $CF_2$.

FIG. 3 is a graph of emission intensity as a function of wavelength that shows the optical emission spectra from the $CF_4$ plasmas tested in Comparative Example 1 and Example 2. The major peaks are identified, with the CF and $CF_2$ peaks being tentatively identified based on the second harmonic reflections from the emission detector grating. In FIG. 3, the optical spectrum for the $CF_4$ plasma with no additives is shown by the solid line, the optical spectrum for the $CF_4$ plasma with 200 sccm of $O_2$ is shown by the dashed line, and the optical spectrum for the $CF_4$ plasma with 200 sccm of water vapor is shown by the dotted line.

FIGS. 4A and 4B are graphs of the $CF_4$ destruction efficiency, i.e., the percentage of $CF_4$ converted into less harmful forms, as a function of the additive flow rate as indicated by the decreased optical emission peaks of CF (FIG. 4A) and $CF_2$ (FIG. 4B). In FIGS. 4A and 4B, the curve for the plasma with water ($H_2O$) vapor as the additive is shown by the solid line and the curve for the plasma with oxygen ($O_2$) as the additive is shown by the dashed line. The data shown in FIG. 4A is taken at 493.3 nm, which corresponds to a doubled 247.9 mn CF peak. The data shown in FIG. 4B is taken at 524.4 nm, which corresponds to a doubled 262.8 nm $CF_2$ peak.

As shown by the reduced optical emission peaks characteristic of CF and $CF_2$ in FIG. 3, water vapor is consistently and significantly more efficient at abating $CF_4$, i.e., converting $CF_4$ into less harmful forms, than oxygen. As shown in FIG. 4A, for 500 sccm of additive, water vapor reduces the CF peak by 97%, whereas oxygen reduces the CF peak by only 86.7%. As shown in FIG. 4B, for 500 sccm of additive, water vapor reduces the $CF_2$ peak by 98.5%, whereas oxygen reduces the $CF_2$ peak by only 92.2%. For ease of comparison, this data for the abatement of $CF_4$ for 500 sccm of additive is shown below in Table A.

TABLE A

| Additive | % Destruction CF (493.3 nm) | % Destruction $CF_2$ (524.4 nm) |
|---|---|---|
| $O_2$ | 86.7% | 92.2% |
| $H_2O$ | 97.0% | 98.5% |

Thus, as demonstrated by the data shown in Table A, for 500 sccm of additive, water vapor destroys significantly more $CF_4$ than oxygen. Moreover, as shown in FIGS. 4A and 4B, water vapor is a significantly more efficient abatement gas than oxygen. Indeed, water vapor can achieve a given percent destruction with about half the flow rate required to achieve such destruction with oxygen. For example, with reference to FIG. 4A, the flow rate required to destroy 80% of CF with water vapor is about 180 sccm, whereas the flow rate required to achieve such destruction with oxygen is about 380 sccm.

It will be apparent to those skilled in the art that the present invention also may be implemented in the form of a method for forming an integrated circuit. In this method, a semiconductor wafer is subjected to plasma processing in a plasma processing chamber, e.g., to deposit a layer or to etch a layer as is well known to those skilled in the art. Thereafter, the exhaust emissions from plasma processing may be contacted with a gas containing water vapor to reduce the amount of perfluorocompound gas contained in the exhaust emissions, as described herein.

In summary, the present invention provides a method for reducing the amount of perfluorocompound gas contained in exhaust emissions from plasma processing in which the exhaust emissions are contacted with a gas containing water vapor. The invention has been described herein in terms of several preferred embodiments. Other embodiments of the invention will be apparent to those skilled in the art from consideration of the specification and practice of the invention. The embodiments and preferred features described above should be considered exemplary, with the invention being defined by the appended claims.

What is claimed is:

1. A method for reducing the amount of perfluorocompound gas contained in exhaust emissions from plasma processing, comprising:

contacting a perfluorocompound gas generated during plasma processing with a gas containing water vapor directly in a plasma processing chamber, wherein the water vapor does not significantly degrade the performance of a plasma process in said plasma processing chamber, and said perfluorocompounding as generated during plasma processing is contacted with said gas containing water vapor directly in said plasma processing chamber by the following operations:

selecting a percentage of said perfluorocompound gas to be abated;

determining a minimum flow rate of water vapor needed to abate the selected percentage of said perfluorocompound gas; and introducing said gas containing water vapor into said plasma processing chamber at the determined minimum flow rate.

2. The method of claim 1, wherein the perfluorocompound gas is selected from the group consisting of $CF_4$, $C_2F_6$, $CHF_3$, $SF_6$, $NF_3$, $C_3F_8$, $C_4F_8$, and mixtures thereof.

3. The method of claim 1, wherein the selected percentage of the perfluorocompound gas to be abated is in a range from about 90% to about 98.5%.

4. The method of claim 1, wherein the gas containing water vapor contains at least about 10% of water vapor.

5. A method for forming an integrated circuit, comprising:

providing a semiconductor wafer;

subjecting said semiconductor wafer to plasma processing in a plasma processing chamber; and contacting a perflorocompound gas generated during plasma processing with a gas containing water vapor directly in said plasma processing chamber to reduce the amount of perfluorocompound gas contained in exhaust emissions from said plasma processing chamber, wherein the water vapor does not significantly degrade the performance of a plasma process in said plasma processing chamber, and said perfluorocompound gas is contacted with said gas containing water vapor directly in said plasma processing chamber by the following operations:

selecting a percentage of said perfluorocompound gas to be abated;

determining a minimum flow rate of water vapor needed to abate the selected percentage of said perfluorocompound gas; and introducing said gas containing water vapor into said plasma processing chamber at the determined minimum flow rate.

6. The method of claim 5, wherein the perfluorocompound gas is selected from the group consisting of $CF_4$, $C_2F_6$, $CHF_3$, $SF_6$, $NF_3$, $C_3F_8$, $C_4F_8$, and mixtures thereof.

7. The method of claim 5, wherein the selected percentage of the perfluorocompound gas to be abated is in a range from about 90% to about 98.5%.

* * * * *